United States Patent [19]
Ohno et al.

[11] Patent Number: 6,038,366
[45] Date of Patent: *Mar. 14, 2000

[54] MAGNETIC RECORDING/REPRODUCING APPARATUS FOR SEARCH PROGRAMS RECORDED ON MAGNETIC TAPE

[75] Inventors: Shoji Ohno; Motoyoshi Sasaki; Hisashi Ohta; Yoshiyuki Azuma; Hiroto Yamauchi, all of Hitachinaka; Katsuhiko Abe, Tokorozawa; Mayumi Ueyama, Tokyo, all of Japan

[73] Assignee: Hitachi, Ltd., Tokyo, Japan

[*] Notice: This patent is subject to a terminal disclaimer.

[21] Appl. No.: 09/057,340

[22] Filed: Apr. 9, 1998

Related U.S. Application Data

[63] Continuation of application No. 08/500,261, Jul. 10, 1995, Pat. No. 5,761,371.

[30] Foreign Application Priority Data

Jul. 14, 1994 [JP] Japan .................................. 6-161842

[51] Int. Cl.[7] ................................................... H04N 5/76
[52] U.S. Cl. .................................. 386/46; 386/83; 386/95
[58] Field of Search ..................................... 386/1, 46, 39, 386/83, 95–107, 45, 125, 126; 348/461, 464, 465, 468, 474, 476, 478, 483, 485, 731; 360/27, 69, 60; 380/3–5; H04N 5/76, 5/92, 9/79

[56] References Cited

U.S. PATENT DOCUMENTS 5,761,371    6/1998    Ohno et al. ............................... 386/46

Primary Examiner—Thai Tran
Attorney, Agent, or Firm—Antonelli, Terry, Stout & Kraus, LLP

[57] ABSTRACT

A magnetic recording/reproducing apparatus having a capability of allowing contents of records on a magnetic tape to be discriminatively identified and a capability for displaying closed caption includes a tape map memory for storing contents recorded on a tape and a tape map controller. As a manual input facility, a tape map button, a caption button, a play-back button, a stop button and others are provided. Upon loading of a tape undergone recording(s), the tape map button is pushed to display on a monitor screen tape map information concerning the contents of program(s) recorded on the loaded tape, temporal duration(s) of the program(s), and history of play-back of the tape.

3 Claims, 11 Drawing Sheets

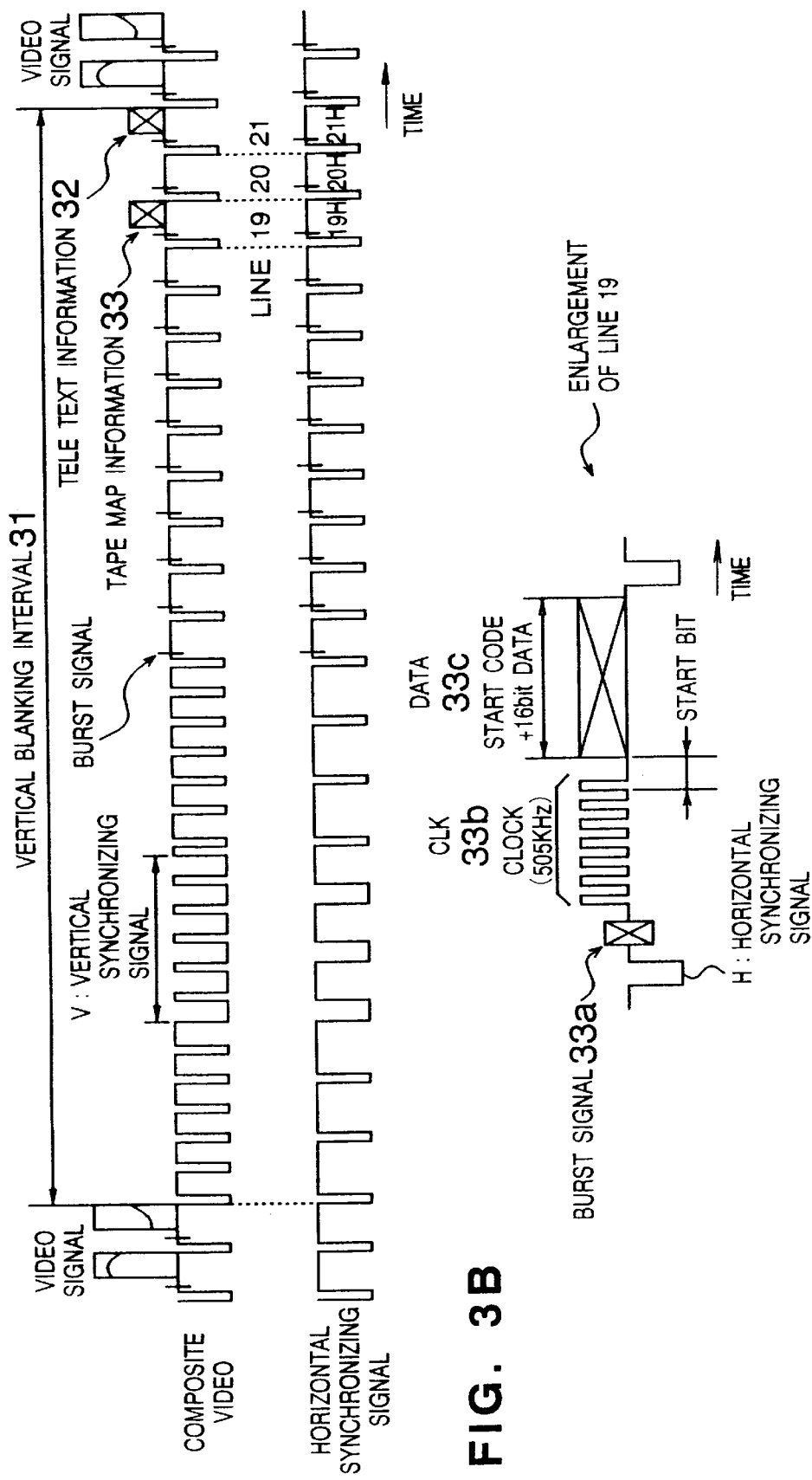

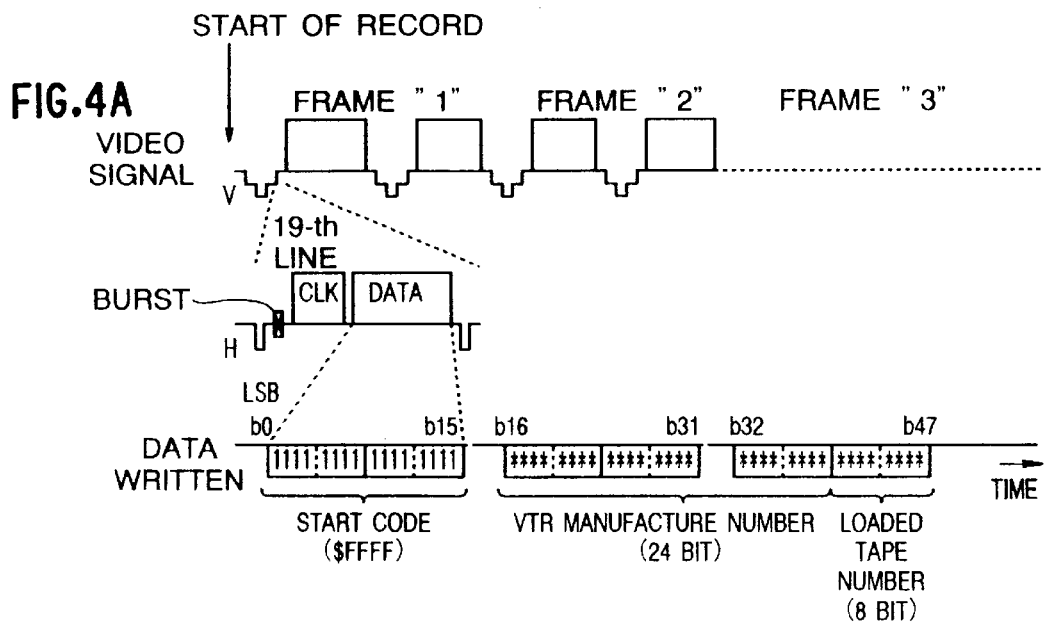
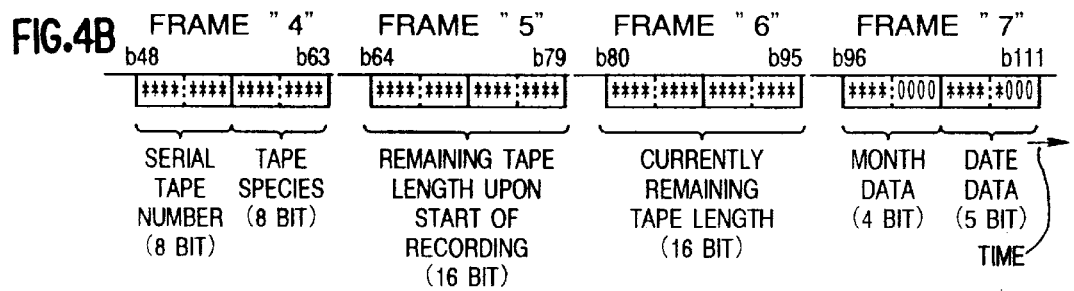
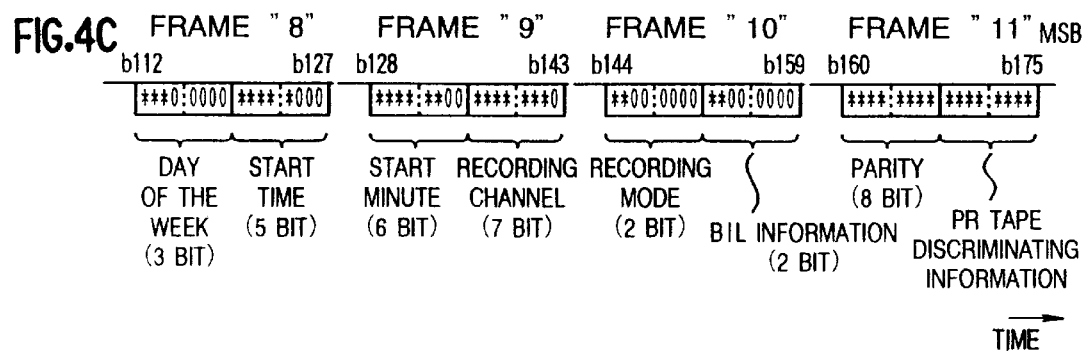

FIG. 6

MAGNETIC RECORDING/REPRODUCING APPARATUS FOR SEARCH PROGRAMS RECORDED ON MAGNETIC TAPE

This application is a continuation of Ser. No. 08/500,261 filed Jul. 10, 1995.

BACKGROUND OF THE INVENTION

1. Field of the Invention

The present invention generally relates to a magnetic recording and reproducing apparatus (also known as a video tape recorder or VTR for short). More particularly, the invention is concerned with a magnetic recording/reproducing apparatus which is imparted with capabilities of easily discriminating or identifying a cassette tape as loaded, searching a desired program recorded thereon, indexing heading portions of programs, displaying caption or teletext and so forth by making use of information signals such as a character signal (teletext signal), control signals, etc. which are superposed on a video signal.

2. Description of Related Art

Broadcast service with a video signal superposed with information signals relevant thereto has already been put into practice and known as the television text or teletext broadcasting. In particular, in U.S.A, it has statutorily been recommended or enforced as of 1993 that the television receiver be equipped with a decoder facility capable of displaying conversations exchanged during development of programs, announcements, messages and the like information in the form of captions generated on a display screen so that those who are hard to hear or suffer a hearing loss can equally enjoy the service. In this conjunction, IC decoders designed to this end are manufactured and actually marketed by many semiconductor device manufactures. Incidentally, usage of the decoders for the television receivers are discussed in detail in a Japanese periodical "NIKKEI ELECTRONICS" No. 537, (Sep. 30, 1991), pp. 149–158.

Parenthetically, the inventors of the present application have also proposed a technique for encoding the information signal received in a television text broadcast (teletext broadcast). For particulars, reference may be made to the specification of Japanese Patent Application No. 119539/1993 (JP-A-5-119539).

Besides, Japanese Patent Application No. 96115/1993 (corresponding to JP-A-6-309848) assigned to the same assignee as that of the present application discloses an apparatus for displaying on a monitor screen the information concerning situation of recordings on a magnetic tape usually encased within a cassette for the purpose of facilitating the search or indexing of a heading portion of a program recorded on the tape. More specifically, a memory or storage device for storing information data is incorporated in the magnetic recording/reproducing apparatus, while recording date/time and a time code are recorded on the magnetic tape as the tape identification information in a vertical blanking interval of a video signal for a program. Upon play-back of the magnetic tape, the tape identification information is utilized in displaying en bloc the contents of records on the tape in the form of a list by referencing the information stored in the memory.

At this juncture, it should be mentioned in conjunction with the magnetic recording/reproducing apparatus disclosed in the specification of Japanese Patent Application No. 96115/1993 (JP-A-6-309848) that although the recording date/time and the time code are proposed to be used as the tape identification information written during the vertical blanking intervals of the video signal, no consideration is paid concerning the play-back of a tape on which programs have been recorded by using other magnetic recording/reproducing apparatus. Consequently, upon play-back of the tape recorded by the other magnetic recording/reproducing apparatus, there arises a possibility that the tape may erroneously be recognized as having been recorded by the magnetic recording/reproducing apparatus in which the tape is currently loaded. Besides, specific circuits are additionally required for encoding/decoding the time codes, giving rise to a problem that the manufacturing cost increases.

SUMMARY OF THE INVENTION

In the light of the state of the art described above, it is an object of the present invention to provide a magnetic recording/reproducing apparatus which can facilitate search of programs recorded on a magnetic tape, indexing of heading portion of the programs and display of teletext or closed caption and the like without essentially incurring additional manufacturing cost of the apparatus.

In view of the above and other objects which will become apparent as the description proceeds, it is proposed according to a general aspect of the invention to record tape identification/management information signal in the vertical blanking interval of a video signal in a same format as that adopted in the teletext broadcasting. Owing to such arrangement, the problem of high manufacturing cost mentioned previously in conjunction with the related art can successfully be solved.

According to another aspect of the invention, it is proposed to use as the tape identification information a manufacture number (hereinafter referred to as the VTR manufacture number) of the magnetic recording/reproducing apparatus which was used for recording programs on the tape. By virtue of this, the aforementioned problem of erroneous recognition of the tape can satisfactorily be coped with.

In a preferred mode for carrying out the invention, attribute information of programs recorded on a cassette tape is stored in a library memory. Upon loading of the tape in the magnetic recording/reproducing apparatus according to the invention, the program information inclusive of the attribute information is displayed on a monitor screen in the form of a list. Thus, manipulation of the magnetic recording/reproducing apparatus involved in recording and/or reproducing operation can be much facilitated and simplified.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 3A is waveform diagram for illustrating signals and information signals recorded in a vertical blanking interval of a video signal;

FIG. 3B is a waveform diagram showing a format in which the information signals are recorded;

FIGS. 4A to 4C are schematic diagrams for illustrating contents of the information signals written during the vertical blanking intervals;

FIG. 6 is a view showing, by way of example only, tape map information displayed on a screen of a monitor;

DESCRIPTION OF THE PREFERRED EMBODIMENTS

Figure 1:
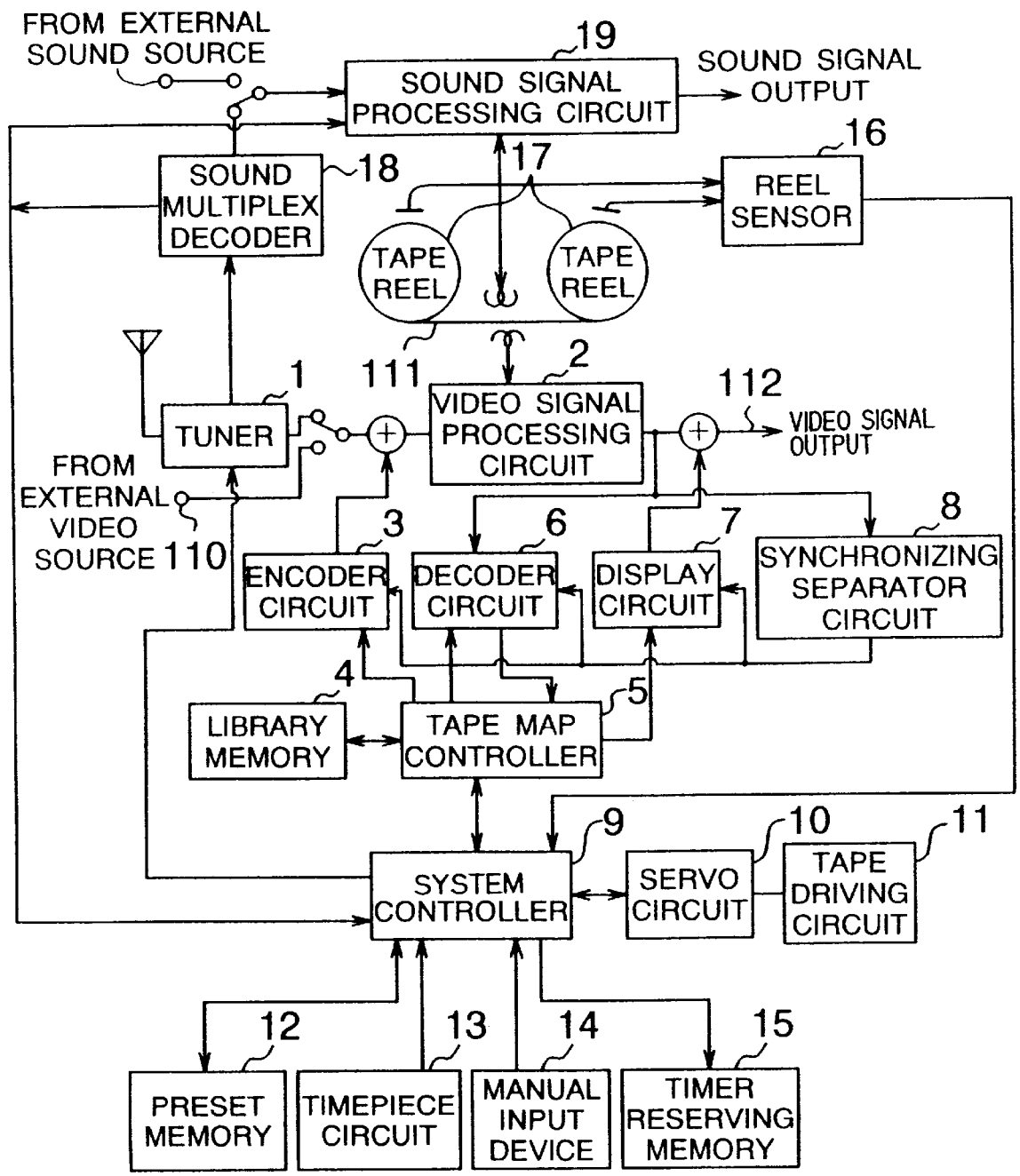
FIG. 1 is a block diagram showing schematically an internal structure of a magnetic recording/reproducing apparatus according to an embodiment of the present invention.

Now, the present invention will be described in detail in conjunction with what is presently considered as preferred or typical embodiments thereof by reference to the drawings. In the following description, like reference characters designate like or corresponding parts throughout the several views.

FIG. 1 shows in a block diagram an internal structure of a magnetic recording/reproducing apparatus according to an embodiment of the present invention.

In a recording mode, a record signal (i.e., signal to be recorded) is inputted from a tuner 1 of a television receiver or from an external video source by way of an corresponding input terminal 110 to be modulated by a video signal processing circuit 2 for recording on a magnetic tape 111. In that case, information signals such as those illustrated in FIGS. 3A and 3B and FIGS. 4A to 4C are written in vertical blanking intervals of the video signal by an encoder circuit 3. More specifically, all the information written in a vertical blanking interval 31 (conventionally referred to also as the V-blanking interval) of the video signal is illustrated in FIG. 3A. As can be seen in the figure, a teletext (i.e., television text broadcasting) information signal 32 is superposed at a horizontal synchronizing pulse position 21H (21st line), while a tape map information signal 33 is superposed at the a horizontal synchronizing pulse position 19H (19-th line). Referring to FIG. 3B, the tape map information signal 33 is composed of a burst signal 33a, a clock signal (CLK) 33b and data (DATA) 33c. As an example of the data 33c, a start code is shown in FIG. 3B. The tape map information signal 33 is written at the 19-th line or 19H (where H represents the horizontal synchronizing pulse and thus "19H" represents the 19-th horizontal synchronizing pulse position) in each of the vertical blanking periods located immediately before the individual frames "1", "2", . . . , of the video signal, as shown in FIGS. 4A to 4C. As the tape map information to be written, there can be mentioned a start code (of 16 bits) written immediately before the frame "1", VTR manufacture number data (of 24 bits) written in the vertical blanking interval immediately before the frame "2", and a preceding half portion of the vertical blanking interval immediately before the frame "3", a currently loaded tape ID number (of 8 bits) written in a succeeding half of the vertical blanking interval before the frame "3", a serial tape number (of 8 bits) written in a preceding half of the vertical blanking interval immediately before the frame "4" and tape species information (of 8 bits) written in a succeeding half of the vertical blanking interval before the frame "4". In the vertical blanking intervals preceding to the succeeding frames "5", "6", . . . , "11", respectively, there are written data such as illustrated in FIGS. 4A to 4C. Since one data consists of two bytes or 16 bits, the tape map data as written amounts to 22 bytes (where one byte equals eight bits) in total. The data of 22 bytes are written in the vertical blanking intervals of the video signal in secession till the end of the recording. Of the data to be written, the start code data, the VTR manufacture number data, the currently loaded tape ID number data, the serial tape number data and the tape species data are prepared in a library memory 4. Further, data of receiving channel of the tuner 1, current date/time data generated by a timepiece circuit 13, residual tape data calculated on the basis of output of a reel sensor 16 which is adapted to detect rotations of a reel support 17a and bilingual/stereo mode data generated by a sound multiplex decoder 18 are supplied to a tape map controller 5 as the data to be written in such a number as illustrated in FIGS. 4A to 4C. These data are written in the vertical blanking intervals of the video signal, as mentioned above, through the encoder circuit 3 under the control of the tape map controller 5.

In a play-back mode, the tape map information recorded on the tape in the manner described above is read out to be decoded by the decoder circuit 6 to be subsequently supplied to the tape map controller 5 for checking whether the VTR manufacture number, the currently loaded tape ID number and the serial tape number match with those stored in the library memory 4, respectively.

Figure 6:
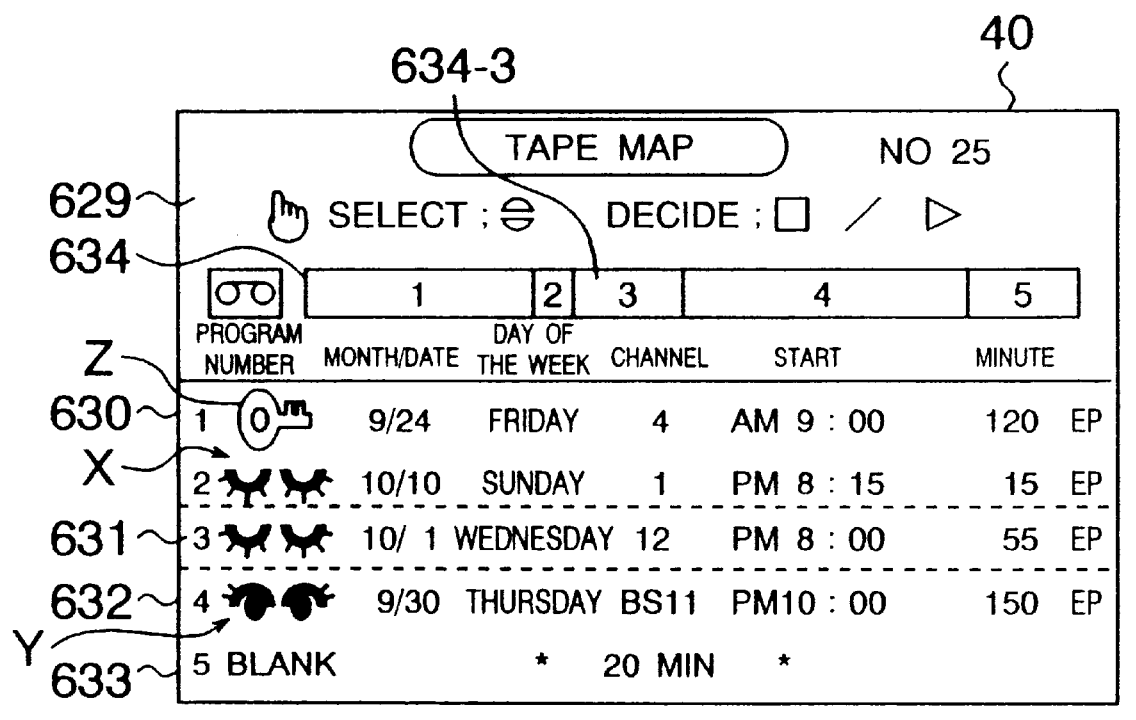

In response to a display request for the tape map information as issued from a manual input device 14, the contents of the library memory 4 are sent to a display circuit 7 via a video output terminal 112 for generating a display of a picture 40 illustrated, only by way of example, in FIG. 6 on a monitor screen.

Figure 5:
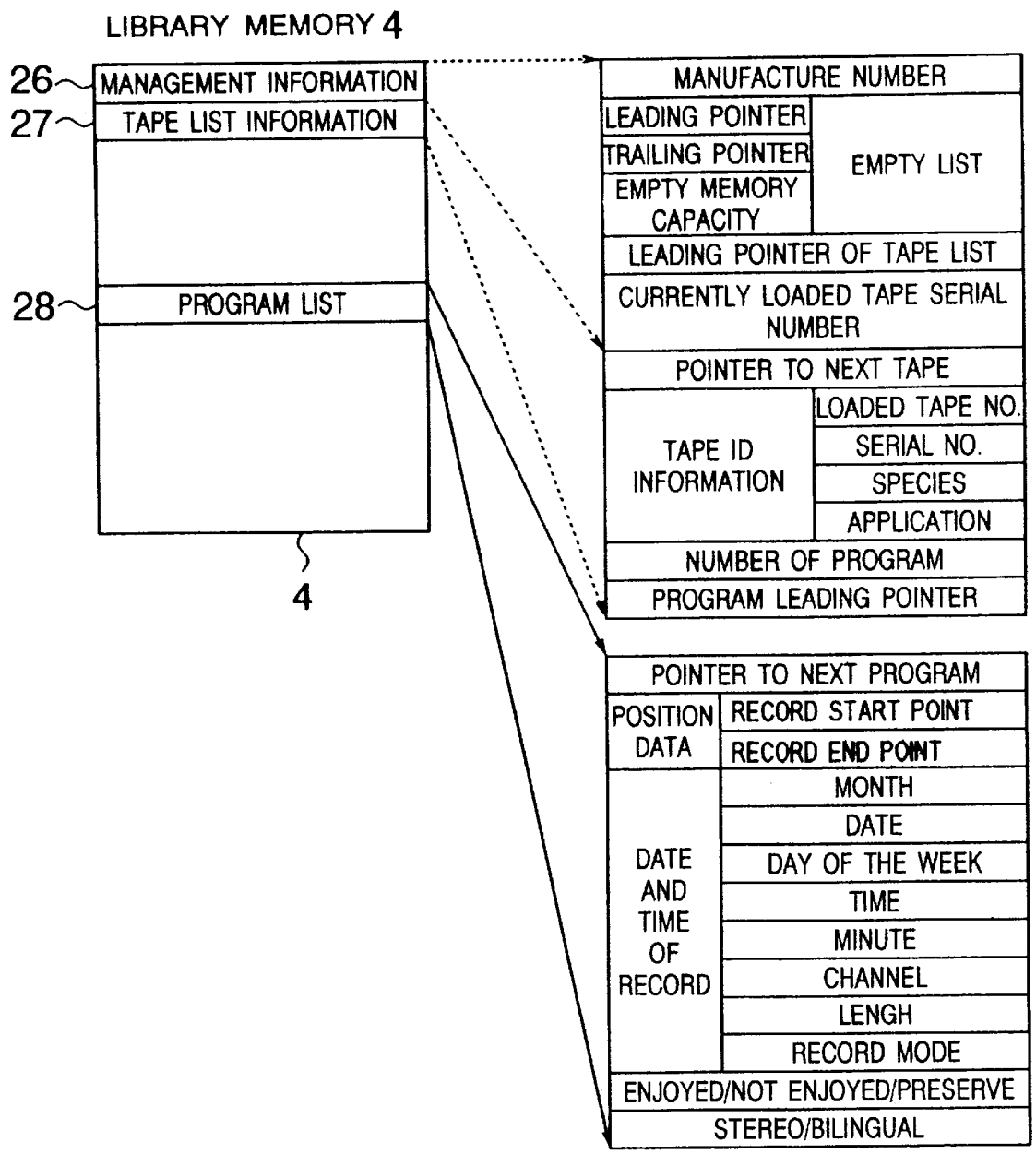
FIG. 5 is a diagram showing an internal structure of a library memory used in the magnetic recording/reproducing apparatus according to an embodiment of the invention.

FIG. 5 is a diagram showing a structure of the library memory 4. In this conjunction, it is assumed that the contents of the memory 4 include three kinds of information, i.e., management information 26, tape list information 27 and a program list 28.

The management information 26 is composed of a VTR manufacture number of the magnetic recording/reproducing apparatus now of concern, a leading pointer, a trailing pointer, an empty memory capacity of an empty list, a leading pointer of tape list information and a serial tape number of the currently loaded tape. The VTR manufacture number is used for determining whether a tape as loaded in the recording/reproducing apparatus is the tape processed by the same apparatus (i.e., whether both the recording and the play-back are effected by the same VTR). The empty list pointer indicates an address where the data such as mentioned above are to be stored in the library memory 4 upon recording of a new program. Further, owing to the information concerning the empty or unoccupied memory capacity, it is possible to generate an alarm when the memory becomes full. The serial tape number is automatically updated by a counter upon deletion of the tape from the library for preventing duplication of the tape identifying number.

The tape list information 27 contains management data for each volume of the tape. This management data includes a pointer indicating location of a succeeding tape list information, the currently loaded tape ID number, the serial tape number, the tape species and the application as the ID data for identifying the tape, the number of all the programs as recorded on the tape and a pointer indicating an address of a program list. The tape species data represent tape species such as "T-60", "T-120", "T-140", "T-160" or the like. By using this tape species information, it is rendered unnecessary to discriminate the cassette tape every time it is loaded. The automatic cassette tape discrimination or identification requires one full rotation of the reel support. By storing the above-mentioned information in the memory, such a display as illustrated in FIG. 6 is generated immediately after the loading of the cassette tape, whereby time information concerning a residual time of the tape (i.e., time corresponding to the length of tape remaining to be used) can be displayed at an area 633 labeled "BLANK" together with a band graph 634, description of which will be made later on.

The program list 28 is destined to store the data for each of programs as recorded. This program list 28 contains a pointer indicating a location of a succeeding program, data indicating positions of programs recorded on the tape, data of recording date/time and channel, data indicating the state of the tape "enjoyed", "not yet enjoyed" and "preserve" for each of the programs and sound mode data indicating "bilingual" and "stereo mode". On the basis of these data, the tape map display such as illustrated in FIG. 6 is displayed on a monitor screen by using characters and/or graphics indicating on a line-by-line basis the states or situations in which each of the programs has been recorded.

Now, let's assume, by way of example, that a picture 40 illustrated in FIG. 6 is displayed on the monitor screen upon loading of a cassette tape. In this case, it is indicated that the tape as loaded is in the stand-by state with the introduction or heading portion of a program "3" being positioned ready for start of the play-back operation, as indicated by a reference numeral 634-3.

A reference numeral 629 designates a guide display field for the tape map. A symbolized key 630 as displayed indicates that the program of concern is to be preserved. A reference numeral 631 designates a cursor display generated for indicating a selected program. In practical application, characters indicating information for the selected program is displayed in red against the background color of green with the non-selected programs being displayed in black against the background of green. Finally, a reference numeral 634 designates a band graph showing the information of all the programs recorded on the loaded tape, wherein numerals as inserted in the band path indicate the corresponding program identification numbers, respectively.

In this conjunction, it is assumed that the display circuit 7 shown in FIG. 1 is so designed as to generate background colors on a character-by-character basis. More specifically, both the background color for the character data displayed in black in the cursor display 631 as selected and the background color for the character data displayed in black in the area 634-3 of the band graph 634 as selected are displayed in red. In this way, by making the background color for the cursor area coincide with the background color for the selected portion of the band graph as displayed, visual recognition or visibility of the displayed information can remarkably be improved.

A symbol designated by Z and appearing at an upper left corner of the preserved program 630 symbolizes a key in the locked state. Thus, the graphic symbol "key" designated by Z indicates that the relevant program is inhibited from the overlay or overwrite recording so that the program of concern is protected against inadvertent erasure. On the other hand, a symbol designated by X displayed at lower left corner of a selected program display line 630 symbolizes eyes in the closed state. This indicates that the relevant program 631 has not been watched or enjoyed yet. Further, a mark Y displayed at an upper left corner of a succeeding program symbolically represents eyes in the opened state, indicating that the program 632 has already been watched. Finally, a bottom graph band 633 displays a residual time corresponding to a length of the tape remaining to be recorded. Starting from the display state mentioned above, it is possible to trigger a desired operation of the magnetic recording/reproducing apparatus by searching a heading portion of a desired program by pushing selectively a play button, a stop button or a record button.

Figure 7:
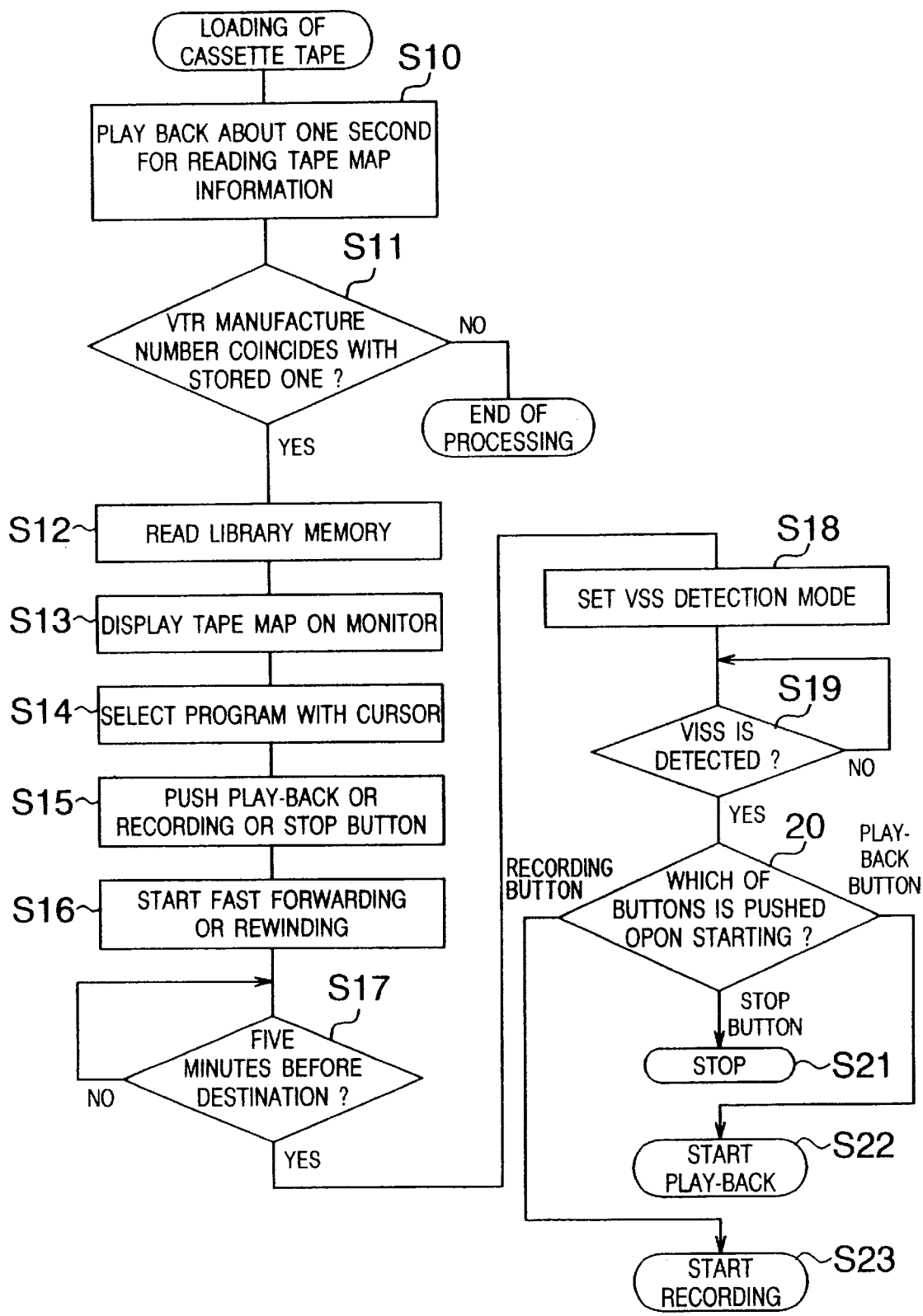
FIG. 7 is a flow chart for illustrating a procedure for controlling a tape heading portion search or indexing operation.

Now, referring to a flow chart of FIG. 7, a control procedure will be explained.

In a step S10, a preliminary play-back operation is automatically carried out for about one second to thereby read out the tape map information or data which is recorded in the vertical blanking intervals of a video signal, as described hereinbefore by reference to FIG. 4.

In a step S11, it is checked whether the VTR manufacture number data as fetched from the tape coincides with the VTR manufacture number stored in the library memory 4 shown in FIG. 1. Unless coincidence is found, this control processing is terminated by regarding the tape as loaded is not the one of concern.

In a step S12, the tape list information and the program list information are read out from the library memory 4 shown in FIG. 1.

In a step S13, the information or data as read out from the library memory 4 are supplied to the display circuit 7 to be displayed as a picture 40 on the monitor screen in such a manner as illustrated in FIG. 6.

Figure 8:
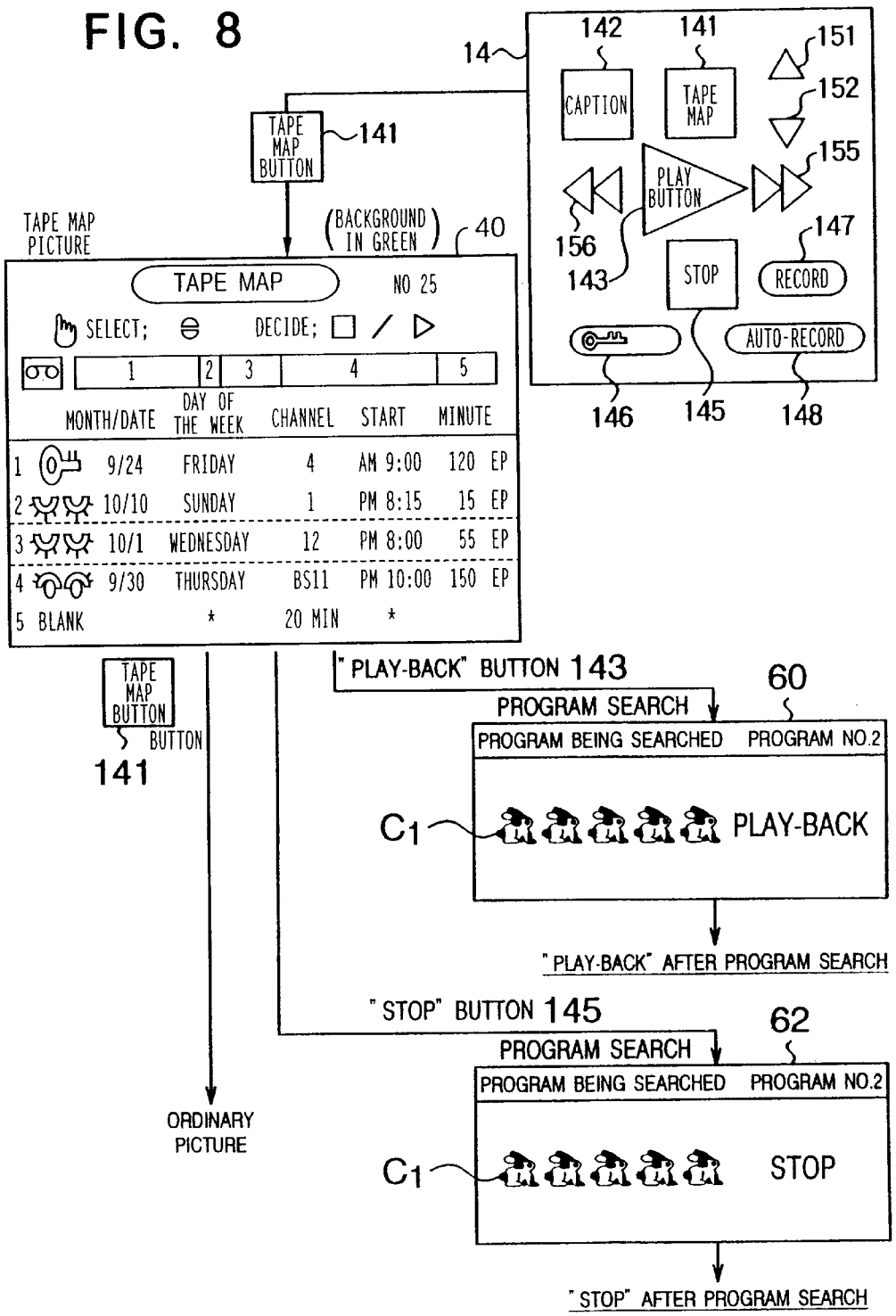
FIG. 8 is a functional flow chart for illustrating a program heading portion indexing operation together with information displays as generated on a monitor screen.

In a step S14, buttons 151 and 152 shown in FIG. 8 are pushed to move the cursor for selecting a program.

In a step S15, a play button for reproduction or a recording button or a stop button is pushed.

In a step S16, the tape is fast forwarded (quick fed) or rewound toward the heading portion of the program from the current tape position.

In a step S17, it is checked whether the tape has reached a position which precedes to the destination by five minutes or so.

In a step S18, a VISS (VHS Index Search System) signal detection mode is set up, whereon the tape feeding speed is correspondingly controlled.

In a step S19, operation commanded by the button pushed in the step S15 is triggered in response to detection of the VISS signal.

At this juncture, it should be mentioned that during the fast forwarding (quick feeding) or rewinding operation for the program search, a display which indicates definitely that the magnetic recording/reproducing apparatus is in the program searching mode is displayed in order to improve manipulatability of the apparatus. This will be described below in some detail.

FIG. 8 is a functional flow chart for illustrating monitor screen displays generated during a program search operation.

It is assumed that the magnetic recording/reproducing apparatus under consideration is equipped with a manual input device 14 of such configuration as shown in FIG. 8, by way of example only. More specifically, in the manual input device 14, a reference numeral 141 denotes a tape map button and a numeral 142 denotes a caption button. Further, a numeral 143 denotes a play button for reproduction, 145 denotes a stop button, 146 denotes a record preservation command button, 147 denotes a record button, 148 denotes an automatic record button, 155 denotes a fast forward button, and a reference numeral 156 denotes a rewind button.

When the tape map button 141 of the manual input device 14 is pushed, the tape map picture 40 shown in FIG. 6 is displayed on the monitor screen. In this state, the background color of the line for the program No. 3 and that of the corresponding area 634-3 in the band graph 634 are changed, which indicates that the tape is currently in the stand-by state at the heading portion position of the program No. 3. By pushing again the tape map button 141, starting from this state, it is possible to play back the program No. 3.

In FIG. 8, reference numerals 151 and 152 denote cursor moving buttons, respectively. By manipulating these cursor buttons 151 and 152, it is possible to move the cursor region displayed in red upwardly or downwardly by changing the background color for the character data displayed in black in the tape map picture from green to red.

Thus, by moving the cursor to the position of the program No. 2 and pushing the play button 143 for reproduction, an information picture 60 (FIG. 8) is displayed on the monitor screen. This information picture 60 contains a graphics/character string messaging that the program No. 2 is being searched. In other words, a running graphics (rabbits)/character string $C_1$ indicates that the tape is currently running toward a position ready for the play-back operation. Owing to the display of the running graphics/character string $C_1$, it can visually be confirmed that the magnetic recording/reproducing apparatus is currently in the program search mode.

Upon completion of the heading portion indexing operation for the program No. 2, the magnetic recording/reproducing apparatus is automatically shifted to the play-back mode, and hence the play-back of the program No. 2 is started.

By moving the cursor to the position of the program No. 2 and pushing the stop button 145, a guide picture 62 is displayed. This picture 62 contains a graphics (rabbit)/character string informing that the program No. 2 is being searched. In other words, a running graphics/character string $C_1$ runs toward a destination at which the tape is to be stopped. Owing to the display of such running graphics/character string $C_1$, it can visually be confirmed that the magnetic recording/reproducing apparatus is currently in the program search mode for the play-back or stop.

Upon completion of the heading portion indexing operation for the program No. 2, the running state of the graphics/character string $C_1$ is stopped, indicating that the program search operation comes to an end. Subsequently, the tape map button 141 may be pushed to start the play-back operation of the program No. 2.

Figure 9:
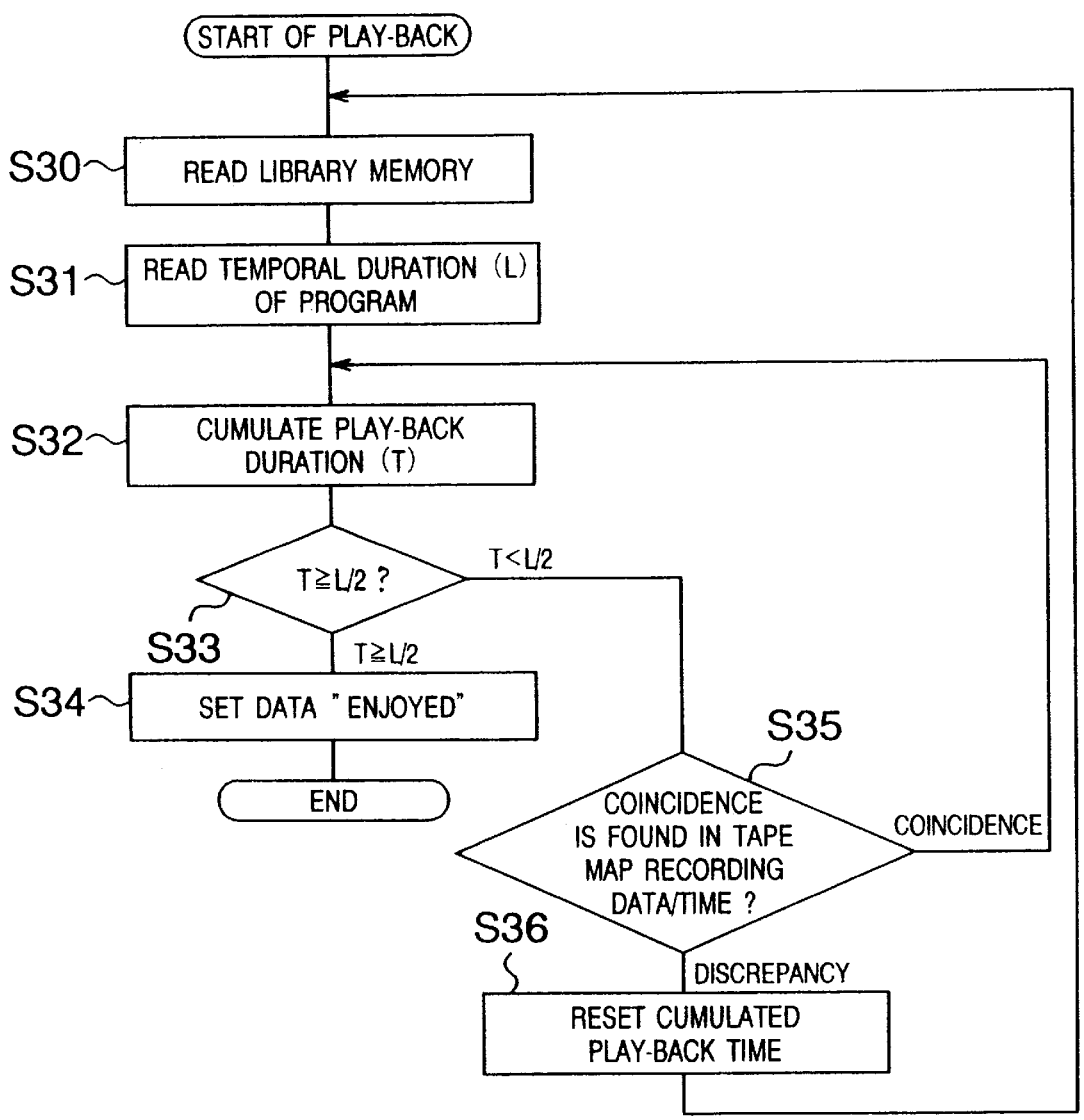
FIG. 9 is a flow chart for illustrating a control procedure for automatically managing programs already enjoyed and those not yet enjoyed.

FIG. 9 is a flow chart for illustrating a control procedure for generation of a mark display indicating that a program has been enjoyed or watched.

Referring to the figure, in a step S30, a program list corresponding to a program being played back is read out from the library memory 4 shown in FIG. 1.

In a step S31, length data of the program is read out from the program list by the tape map controller 5. This length is represented by L.

In a step S32, duration of time consumed or lapsed in the play-back operation is cumulatively counted by the system controller 9. This time lapse is represented by T.

In a step S33, it is checked whether or not the time T is greater than the length L/2 in the equivalent sense.

In a step S34, data "enjoyed" is entered in the program list by the tape map controller 5, when it is decided in the step S33 that T>L/2.

On the other hand, when decision is made in the step S33 that T≦L/2, it is checked whether the recording date/time data written on the tape coincides with the corresponding data in the program list in a step S35. Upon occurrence of discrepancy, the cumulated reproduction time T is reset in a step S36.

In this way, the data or mark "enjoyed" can be set up equally in the case where a program has continuously be played back over more than a half. Of course, the same mark data may arbitrarily be set up in the case where a program has been played back over two thirds or four fifths of the whole length of the tape.

Figure 10:
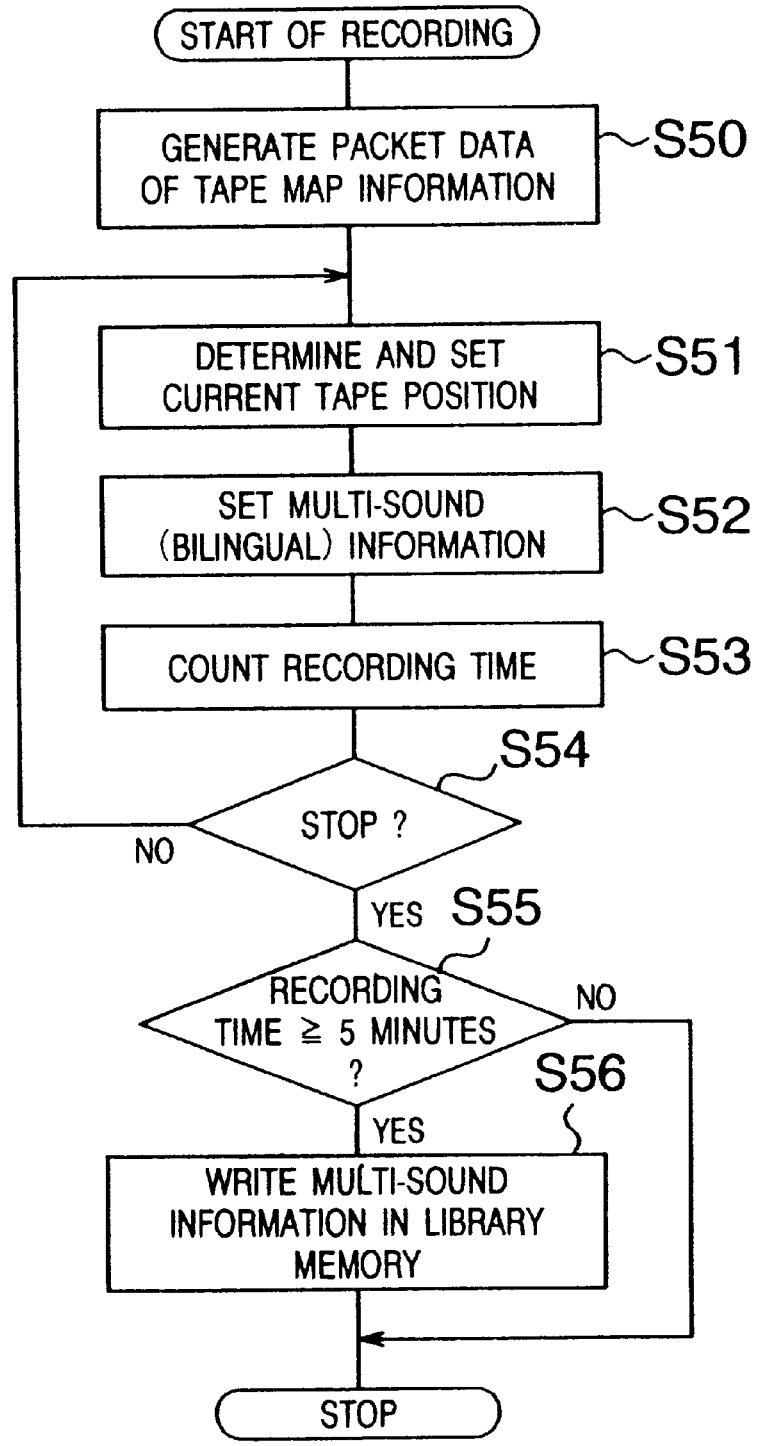
FIG. 10 is a flow chart for illustrating a control procedure for registering a program of a length greater than a predetermined value in a library memory.

FIG. 10 is a flow chart for illustrating an additional registration procedure for the program list in the recording mode of the magnetic recording/reproducing apparatus.

In a step S50, packet data of the tape map information such as shown in FIG. 4 is generated by the tape map controller 5 simultaneously with the start of the recording operation.

In a step S51, tape position data indicating the current tape position is arithmetically determined on the basis of the input data supplied from the reel sensor 16 shown in FIG. 1 to be subsequently placed in the tape map information.

Further, in a step S52, the information supplied from the sound multiplex decoder 18 is placed in the tape map information as well.

In a step S53, cumulated recording time is determined.

In a step S54, the cumulated recording time is checked in response to actuation of the stop button.

Only when it is found in a step S55 that the cumulated recording time amounts to five minutes or more, the tape map information is written in the library memory 4 in a step S56. In this manner, the library memory 4 is prevented from becoming full with records of short durations.

Figure 11:
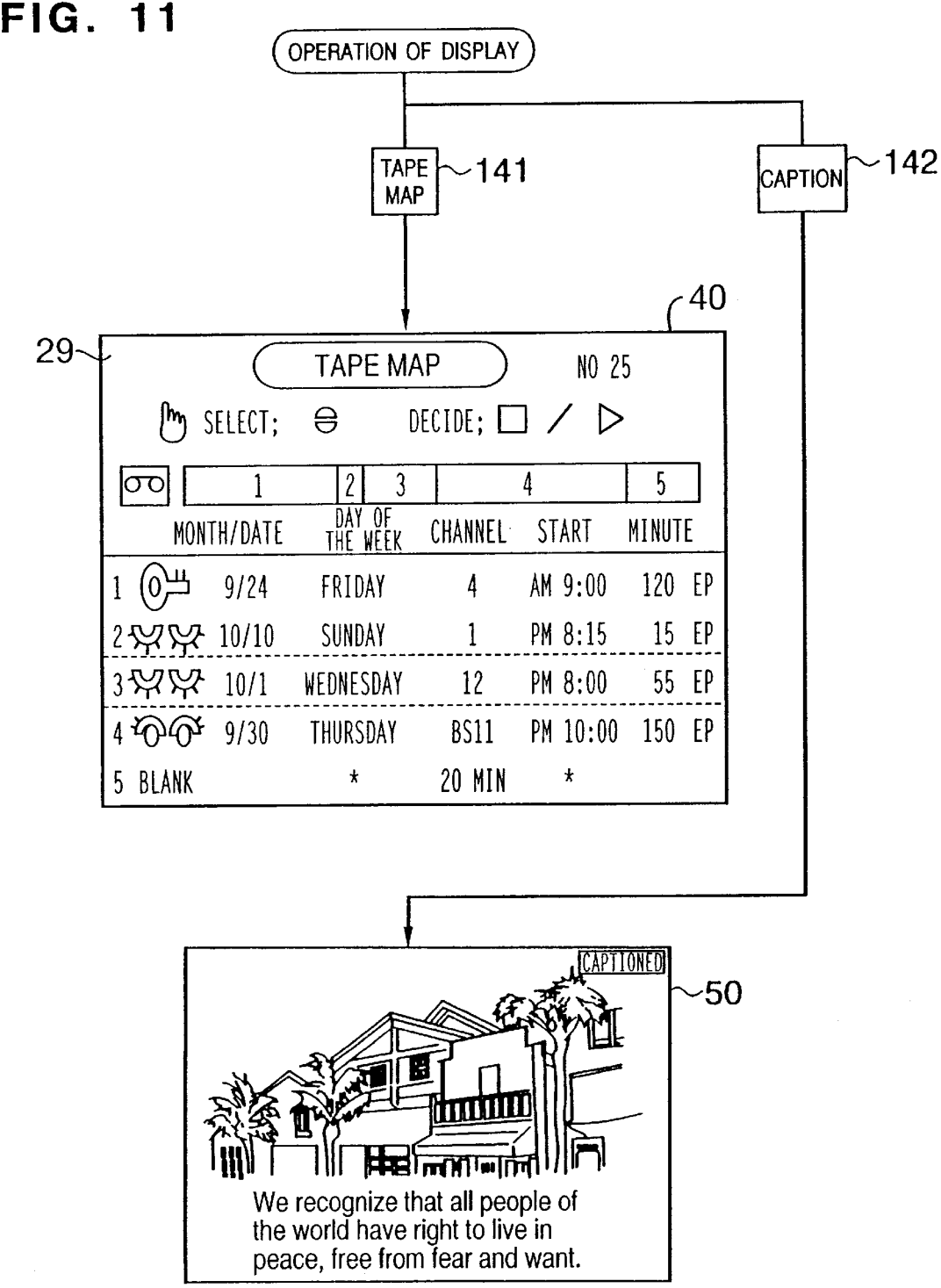
FIG. 11 is a flow chart for illustrating a procedure for changing over a tape map display and a caption display.

As described hereinbefore, in the magnetic recording/reproducing apparatus according to the present invention, the tape map data is written in the same format as that for the television text or teletext broadcasting. Accordingly, by changing over the decoding position of the decoder circuit from the position 19H for the tape map information to the position 21H for the teletext, the caption display can easily be realized by making use of the television text (teletext) broadcasting. FIG. 11 is a flow chart for illustrating schematically a change-over procedure to this end. Referring to the figure, the tape map button 141 and the caption button 142 are incorporated in the manual input device 14, as described hereinbefore, in conjunction with FIG. 8. When the tape map button 141 is pushed, this event is messaged to the tape map controller 5 by way of the system controller 9 shown in FIG. 1. In response, the tape map controller 5 sets a decoding position determining circuit 21 incorporated in the decoder circuit 6 and shown in FIG. 2 to the position 19H. On the other hand, in response to the actuation of the caption button 142 shown in FIGS. 8 and 11, the tape map controller 5 sets the decoding position determining circuit 21 to the position 21H. In the decoder circuit 6 shown in FIG. 2, a horizontal synchronizing pulse counter 22 counts the horizontal synchronizing pulses outputted from a synchronizing separator circuit 8. When the counted value attains the preset value, the decoding position determining circuit 21 actuates a clock generating circuit 24 for causing it to generate a clock signal for sampling the tape map information data carried by the video signal inputted from the video signal processing circuit 2 shown in FIG. 1. The tape map information contained in the video signal is inputted to a data slicer 20. A shift register 23 fetches the output of the data slicer 20 in response to the clock signal mentioned above. The data fetched by the shift register 23 is transferred to a data register 25 every time the data amounts to 16 bits. The output of the data register 25 is transferred to the tape map controller 5 shown in FIG. 1 to be thereby read out by the controller 5, whereupon the processing described hereinbefore is executed for the set position 19H, while for the set position 21H, the data read out is supplied to the display circuit 7 to be superimposed as ASCII (American Standard Code for Information Interchange) text data on a picture displayed on a television screen, as exemplified by a picture 50 shown at a bottom in FIG. 11.

Figure 2:
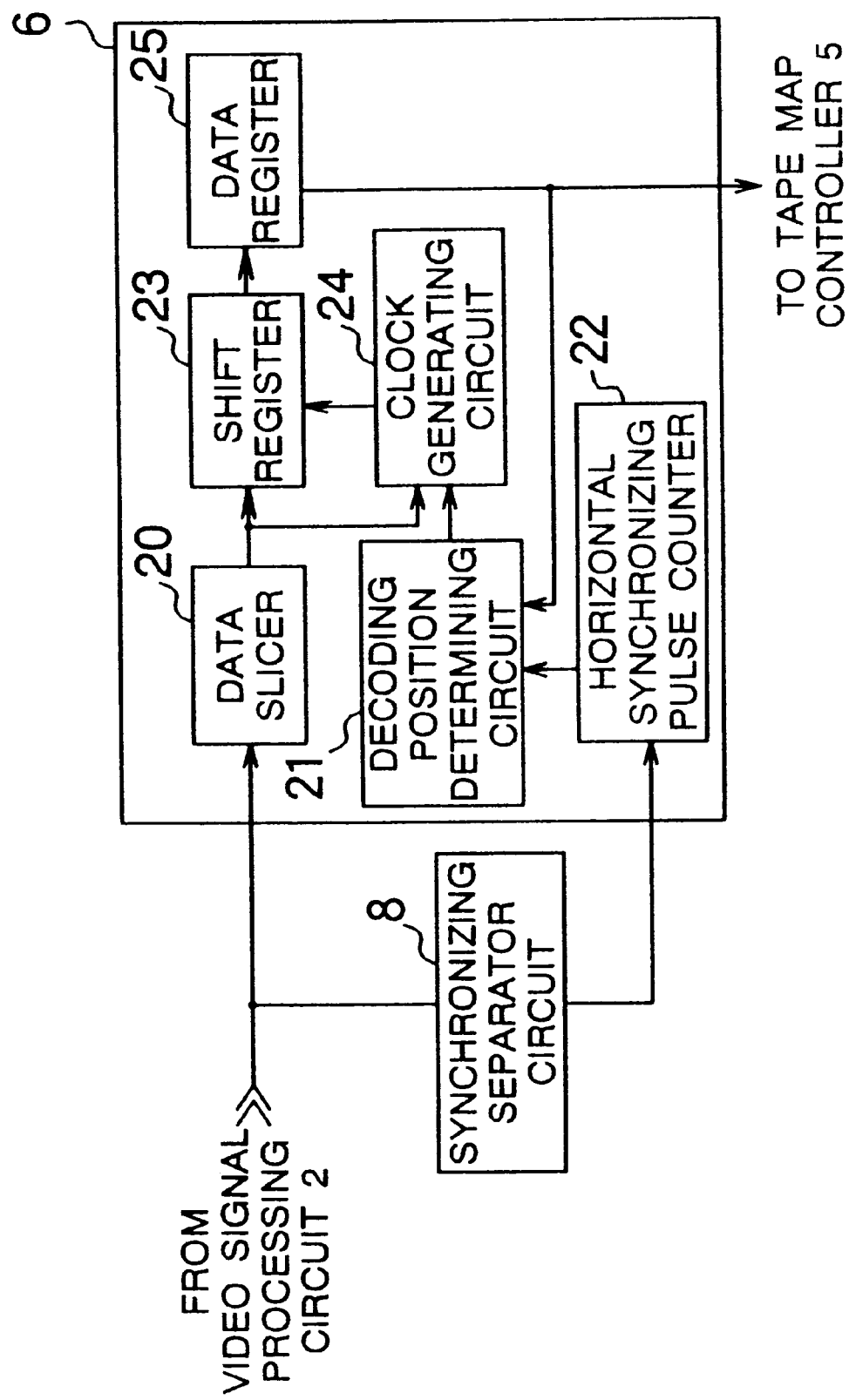
FIG. 2 is a block diagram showing an internal structure of an encoder circuit incorporated in the magnetic recording/reproducing apparatus shown in FIG. 1.

Now, processing procedure for realizing the caption display function will be described in conjunction with the decoder circuit 6 shown in FIG. 2. When the caption button 142 shown in FIGS. 8 and 11 is pushed, this event is fetched by the system controller 9 from the manual input device 14 to be sent to the tape map controller 5. In response, the tape map controller 5 sets the decoding position determining circuit 21 shown in FIG. 2 to the position 21H. This circuit 21 is constituted by an internal register of the decoder circuit 6 for decoding the caption information signal at the position 21H in every vertical blanking interval. More specifically, the decoder circuit 6 compares the content or count value of the horizontal synchronizing pulse counter 22 with the value representing the position 21H. When the comparison results in coincidence, the clock generating circuit 24 generates the data sampling clock signal.

The shift register 23 shifts bit by bit the data digitized by the data slicer 20 in response to the above-mentioned clock signal. After sixteen shifts in total, the content of the shift register 23 is transferred to the data register 25. The tape map controller 5 shown in FIG. 1 reads out this 16-bit data from the data register 25 shown in FIG. 2. At this juncture, it should be mentioned that, in the caption superimpose mode, the 16-bit data is composed of two bytes each of seven bits added with a parity bit. These bytes are discriminatively identified as character codes and control codes, respectively. The control codes serve for implementing the functions for designating a position or positions at which characters are to be displayed, colors for display, font of characters and others. The tape map controller 5 shown in FIG. 1 alters the content of an internal register of the display circuit 7 in accordance with the control codes to thereby replace the character codes as received by the character data which are used for display in the magnetic recording/reproducing apparatus, wherein the character data are stored in a display memory incorporated in the display circuit 7. In this way, the caption display such as exemplified by the picture 50 shown in FIG. 11 can be generated.

In general, the display position for the caption is determined by the display position designation control data inserted at the side of a broadcasting station. However, it is possible to display the caption at a fixed position by neglecting the display position designation data inserted by the broadcasting station. In that case, when a Japanese caption to be superimposed in a picture is used in addition to an English caption, both the captions can simultaneously be displayed on the monitor or television screen without being superposed onto each other.

As another application of the present invention, there may be mentioned an automatic selecting function for selecting the sound multiplex mode upon reproduction of a tape. For reception of the sound multiplex broadcasting, it is possible to automatically identify whether the sound multiplex mode is for a bilingual broadcasting or a stereo broadcasting. However, such discriminative identification has heretofore been impossible once programs as broadcasted was recorded by the magnetic recording/reproducing apparatus. By contrast, according to the teachings of the invention, it is possible to automatically identify the stereo mode or the bilingual mode by writing the sound multiplex mode data in the vertical blanking interval upon recording of the corresponding program on the tape and reading out the same data in the play-back mode to thereby control the sound signal processing circuit.

Turning back to FIGS. 4A to 4C, there is shown the data to be recorded in the vertical blanking interval 19H of the video signal, wherein the BIL (bilingual) mode information or sound multiplex mode information is recorded at the two bits $b152$ and $b153$ in vertical blanking interval preceding to the frame "10". Upon recording, the system controller 9 shown in FIG. 1 receives from the sound multiplex decoder 18 the sound multiplex mode information indicating whether a program as received is being broadcasted with main/sub-lingual signals or with stereo signal or with a monaural signal. This information is then supplied to the tape map controller 5. In response, the tape map controller 5 generates data such as illustrated in FIGS. 4A to 4C on the basis of both information mentioned just above and other tape map information. The data thus generated is supplied to the encoder circuit 3 shown in FIG. 1 to be recorded in superposition on other tape map information in the vertical blanking interval 19H of the video signal.

On the other hand, in the play-back operation, the data mentioned above is read out by the decoder circuit 6 to be sent to the tape map controller 5. In response, the tape map controller 5 extracts the BIL information from the furnished data to supply to the system controller 9 a sound multiplex mode identifying signal indicating whether the program being reproduced is accompanied with the main/sub-lingual signal or stereo/monaural signal. Upon reception, the system controller 9 sets a sound signal processing circuit 19 to one of the audio output modes L (left), R (right), L·R and L+R. In this way, the program can be reproduced with a same sound mode as that monitored in the recording operation.

As a further application of the present invention, there may be mentioned a so-called automatic timer recording. In general, some of television programs are broadcasted in continuation on a week-by-week basis. (Suppose, by way of example, a program ending with a mark "to be continued to next weeks".) For recording such program, it will be convenient to record a same series of programs on a same cassette tape. This can be achieved by recording a program of concern on a cassette tape loaded in the magnetic recording/reproducing apparatus on a same day of the week, at a same program start time and in a same channel as the proceeding program belonging to the same series.

As described hereinbefore by reference to FIGS. 4A to 4C, the data map information is written in the vertical blanking intervals of the video signal. Of the data map information, the data of remaining tape length at the start of recording operation, the current residual tape data, the month data, the day data, the day-of-the week data, the time and minute at which the recording is started, the channel for the recording and the recording modes (standard, triple speed) are not basically indispensable in realizing the tape map function. These data are used for recovering the contents of the library memory when it is destroyed for some reason or for automation of the timer recording. Upon loading of a cassette tape in the magnetic recording/reproducing apparatus, it is possible to obtain the data concerning the date of recording, day of the week, program start time and minute, channel of concern, recording mode and so forth by reading out the data mentioned above from the loaded cassette tape.

The date for recording can be generated by deriving the current date and the current day of the week from the timepiece function incorporated in the magnetic recording/reproducing apparatus and adding the difference from the day of the week for recording to the current date. Subsequently, the tape loaded in the magnetic recording/reproducing apparatus is fast forwarded to the trailing part of the program from the current position. Detection of the trailing portion can be realized by detecting a blank portion resulting from erasure by the erasing head. By subtracting the residual tape length at the trailing portion from the residual tape length at the recording start point, the length of the recorded program can be determined. By adding the recorded program length to the start time/minute of the same series program to be recorded, the time and the minute at which the program is ended can be determined. These data, i.e., data of the recording date, day of the week, program start time/minute, program end time/minute, recording channel and the recording mode can be set in a timer reserving memory 15 shown in FIG. 1. The succeeding processing are substantially same as in the case of conventional timer-reserve recording.

In case the residual tape length at the blank tape portion is shorter than the tape length equivalent to the program length, the tape is rewound to the beginning thereof. When the cassette tape is taken out from the magnetic recording/reproducing apparatus, the data mentioned previously are deleted from the timer reserving memory 15. In this way, once a certain program is recorded, programs belonging to a same series as the former and broadcast periodically in succession on a week-by-week basis can be recorded in conjunction to the program recorded in precedence.

As is apparent from the foregoing description, according to the present invention, a teletext decoder can be used for decoding the data map information recorded in the vertical blanking intervals of the video signal. Thus, the decoder can easily be implemented inexpensively. Besides, the problem of erroneous tape identification can successfully be solved by using the VTR manufacture identification number. Additionally, by displaying the tape map information on a monitor screen, manipulatability in searching a desired program can be improved. Furthermore, the library memory for storing tape map information can be utilized with very high efficiency. Moreover, discriminative information such as "ENJOYED", "NOT ENJOYED YET" or the like can be displayed on the monitor screen. Still more, the sound multiplex mode in the program recording can automatically be reestablished in the play-back operation. Furthermore, a program belonging to a same series as a preceding program recorded on a cassette tape can automatically be identified in respect to the day of the week, the time/minute and the channel simply by loading the cassette tape in the magnetic recording/reproducing apparatus. It should further be mentioned that a caption display function can additionally be made available without need for changing the circuit configuration.

We claim:

1. A magnetic recording/reproducing apparatus for recording and reproducing a video signal of a plurality of programs on and from a magnetic tape, comprising:

an encoder which encodes an information signal including a magnetic tape identification information signal having an identification number unique to said magnetic recording/reproducing apparatus and an attribute information signal relevant to a video signal to be recorded on said magnetic tape by superposing said information signal on said video signal in vertical blanking intervals of said video signal, and which records the encoded information signal of said video signal and said information signal on a magnetic tape;

a memory which stores said information signal upon recording said video signal and said information signal on said magnetic tape;

a decoder which decodes said information signal superposed on said video signal upon reproducing thereof from said magnetic tape;

an identifier unit which discriminatively identifies whether an inserted tape is one having had said information signal recorded thereon by said magnetic recording/reproducing apparatus by determining whether said identification number contained in said information signal as decoded coincides with the corresponding identification number stored in said memory;

an output unit which, responsive to coincidence of said identification numbers, outputs said attribute information signal corresponding to a plurality of programs recorded on said magnetic tape to be played back onto a television screen to be displayed in lines on a program-by-program basis;

a detector which detects a non-recorded portion of said magnetic tape and displays a presence of the non-recorded portion thus detected on a scanning line of said television screen; and a selector which selects a particular program from said programs corresponding to said attribute information signal displayed on the scanning lines of said television screen and searches the non-recorded portion.

2. A magnetic recording/reproducing apparatus for recording and reproducing a video signal of a plurality of programs on and from a magnetic tape, comprising:

an encoder which encodes an information signal including a magnetic tape identification information signal having an identification number unique to said magnetic recording/reproducing apparatus and an attribute information signal relevant to a video signal to be recorded on said magnetic tape by superposing said information signal on said video signal in vertical blanking intervals of said video signal, and which records the encoded information signal of said video signal and said information signal on a magnetic tape;

a memory which stores said information signal upon recording said video signal and said information signal on said magnetic tape;

a decoder which decodes said information signal superposed on said video signal upon reproducing thereof from said magnetic tape;

an identifier which discriminatively identifies whether an inserted tape is one having had said information signal recorded thereon by said magnetic recording/reproducing apparatus by determining whether said identification number contained in said information signal as decoded coincides with the corresponding identification number stored in said memory;

an output unit which, responsive to coincidence of said identification numbers, outputs said attribute information signal corresponding to a plurality of programs recorded on said magnetic tape to be played back onto a television screen to be displayed in lines on a program-by-program basis;

a selector which selects a particular program from said programs corresponding to said attribute information signal displayed on the scanning lines of said television screen and setting inhibition of over-recording on the video signal of the particular program thus selected; and a display which displays a symbol representing the inhibition of over-recording on said scanning line of said television screen on which said attribute information signal corresponding to said video signal of said particular program is displayed.

3. A magnetic recording/reproducing apparatus for recording and reproducing a video signal of a plurality of programs on and from a magnetic tape, comprising:

an encoder which encodes an information signal including a magnetic tape identification information signal having an identification number unique to said magnetic recording/reproducing apparatus and an attribute information signal relevant to a video signal to be recorded on said magnetic tape by superposing said information signal on said video signal in vertical blanking intervals of said video signal, and which records the encoded information signal of said video signal and said information signal on a magnetic tape;

a memory which stores said information signal upon recording said video signal and said information signal on said magnetic tape;

a decoder which decodes said information signal superposed on said video signal upon reproducing thereof from said magnetic tape;

an identifier unit which discriminatively identifies whether an inserted tape is one having had said information signal recorded thereon by said magnetic recording/reproducing apparatus by determining whether said identification number contained in said information signal as decoded coincides with the corresponding identification number stored in said memory;

an output unit which, responsive to coincidence of said identification numbers, outputs said attribute information signal corresponding to a plurality of programs recorded on said magnetic tape to be played back onto a television screen to be displayed in lines on a program-by-program basis;

a detector which detects a non-recorded portion of said magnetic tape and displays a presence of the non-recorded portion thus detected on a scanning line of said television screen;

a discriminator unit which determines, when said magnetic tape is loaded into said magnetic recording/reproducing apparatus and placed in a stand-by state, whether a portion of said magnetic tape placed in the stand-by state is the non-recorded portion or a portion where the video signal of the program is recorded; and a color controller which differentiates a display color of said non-recorded portion determined as the portion in the stand-by state by said discriminator from a display color of remaining portion on said screen and differentiates a display color of said attribute information signal corresponding to said video signal of said program which is determined as the portion in the stand-by state by said discriminator from a display color of other program recorded on said magnetic tape.

* * * * *